UNITED STATES PATENT OFFICE 2,211,266

TEXTILE SIZING

Henri Gibello, Paris, France, assignor to Societe Nobel Francaise, Paris, Seine, France, a joint-stock company of France No Drawing. Application December 8, 1937, Serial No. 178,827. In France March 13, 1937

10 Claims. (Cl. 260—32)

The present invention relates to improvements in textile sizings and the process of preparing same, and also the sized textiles obtained thereby.

The customary way of sizing textile fibres and cloths made of these fibres is to impregnate or coat with solutions or suspensions composed of various soluble substances in water, such as gums, mucilages, glues, etc.

These types of sizings present certain inconvenient features and cannot be used in all cases occurring in practice. For example, they are fermentable, and due to fermentation exude an extremely disagreeable odor. Furthermore, they are soluble in water, and their fixing is generally fairly difficult and frequently impossible. Besides they are not adapted for furnishing uniform surfaces, i. e. glazing the tissues on which they are applied.

The present invention consists in that it has been found that it is possible to manufacture sizings which do not present the inconveniences enumerated above, by using as a base substance a polyvinyl acetate in the form of an aqueous emulsion.

An object of the present invention is to procide a sizing for textiles which does not injure the textiles and which does not require any subsequent fixing to make it waterproof.

Another object is to provide a sizing which may be readily fixed to make it permanent and unchangeable by water.

Another object is to provide a sizing which softens at body temperature so that garments made from textiles sized therewith adapt themselves readily to the shape of the wearer's body.

A further object is to provide sized textiles which become soft and pliable at body temperatures and adapt themselves to the body of the wearer.

Another object is to produce a sizing by the polymerization of vinyl acetate in an emulsifying medium so that the product is immediately available as a liquid sizing.

A still further object consists in providing a process which may be carried out under ordinary pressure conditions to produce a water and bacteria resistant sizing emulsion.

It has already been proposed to use vinyl chloride polymers and the products of conjoint polymerization of vinyl chloride and vinyl acetate in emulsified or dispersed forms to provide a waterproof textile sizing. The chlorides and other halides, however, have the effect of releasing halogen acids which eventually weaken and destroy the fabrics to which their compositions are applied. Vinyl chloride is a gas and vinyl bromide a low boiling liquid so that polymerization of these substances must be conducted in closed containers at advanced pressures. The polymers of these halides cannot be completely freed of halogen acids and, in addition to this, are unstable and gradually release these acids.

The present invention uses vinyl acetate as its starting substance and produces the sizing in a medium which contains a polymerizing agent, a plasticizer, solvents and an emulsifier. The emulsion produced is of the oil-in-water type and the polymer is retained in suspension in the water partly by the emulsifier and partly by alcohols of low molecular weight which are soluble in water and dissolve both the nonomeric and polymeric vinyl acetate. The plasticizers used must be water soluble. The low molecular weight alcohols, above referred to, act as intermediate solvents between the water and the monomeric and polymeric vinyl acetates. The plasticizers are soluble in both alcohol and water.

Of the emulgents available for use in the sizing, the product manufactured in Germany by the I. G. Farbenindustrie Aktiengesellschaft, and sold under the trade name of "Emulphur-O" has proven preferable because of the high viscosities of the emulsions obtainable with it. The composition of this emulgent is set out in "Melliand Textilberichte"—1935, page 511 to be a condensation product of polymerized ethylene oxide with lauric alcohol, that is, a lauric ether of polyethylene oxide having the formula:

$$C_{12}H_{25}(OC_2H_4)_n OH$$

Emulsions of various polymerized acrylic derivatives are known, but the emulsions prepared according to the present invention have the following characteristics:

(a) They contain a relatively large amount of emulsifying agent or emulgent. In fact, emulsions of the type which have been prepared heretofore, contain as emulgent small quantities of sulphonic derivatives, such as alcoyl naphthaline, which produce emulsions with a high degree of polymerisation and very low viscosity. The emulgent contemplated for use according to the present invention, is the above-mentioned product known to the trade under the name of "Emulphur-O." This product is used in fairly strong concentration which may be from 5% to 20% of the quantity of nonomeric vinyl acetate to be emulsified.

(b) They contain an alcohol sufficiently soluble in water and with a low boiling point which acts as third solvent. Among the substances which may be used are listed methyl alcohol, ethyl alcohol, n-propyl alcohol, isopropyl alcohol and isobutyl alcohol.

(c) They contain a slowly volatile component which serves as a plasticizer for the emulsified polyvinyl acetate. Among the substances which may be used those are given preference which are relatively soluble in water and which possess a free alcoholic function. Among the substances mentioned, benzyl alcohol is mentioned specifically.

The emulsion is prepared by heating its various components to reflux for a sufficiently long period for polymerizing the monomeric vinyl acetate in the presence of a polymerisation catalyst and any desired additions, such as for example pigments and fillers. It is essential that during the entire polymerisation process the emulsion be stirred vigorously and that this stirring be continued until the finished emulsion be completely cooled. The polymerisation catalyst may be destroyed once the emulsion is completed. The product thus obtained shows remarkable stability, is easily diluted with water and can then be used in sizing textiles.

The emulsion, which generally is fairly liquid, may be applied, for example, by means of a brush, or just by steeping. Very frequently the sizing with vinyl emulsion base must be applied on the face of the fabric. In this case it is preferable to thicken the emulsion by means of aqueous solutions of natural gums or resins and to apply the thickened emulsion by means of a scraper or spreading knife using the customary processes.

While sizings prepared as above are insoluble in water they undergo swelling when wet. To prevent swelling it is often desirable to fix the sizing. This may be accomplished by appropriate treatments, as with a caustic alkali solution, with ammonia gas, with organic bases, etc. It must be noted that fixing also improves resistance to water to a considerable degree in the case of mixed sizings containing vinyl resin emulsion as well as natural gums or mucilages.

One of the advantages of sizings made in accordance with the invention is that they may be successfully applied in cases where the sizing must soften at a given temperature. By way of example we mention sizings for the reverse side of velvets and felts intended for use in the hat trade or other purposes.

Fabrics of this sort are finding use in the making of close fitting garments of various types. A product produced according to the present invention ordinarily has a softening point around body temperature. Fabrics sized with such a product are relatively stiff at normal temperatures but upon being raised to body temperature they soften and become very pliable and so adapt themselves very closely and comfortably to the body of the wearer.

The following example shows one method for the preparation of emulsions according to the invention without in any way limiting the same:

Start by mixing and heating in an aluminum vessel containing no copper or iron parts:

|  | Grams |
| --- | --- |
| Water | 3000 |
| "Emulphur-O" | 420 |
| Benzoyl peroxide | 9 |
| Benzyl alcohol | 120 |
| Normal propanol | 720 |

After solution add:

Pure monomeric vinyl acetate _____ 6000

Carefully maintain at boiling for 5 hours in a water bath, the vessel being provided with a reflux condenser and a thermometer.

At the end of this period the emulsion is cooled by circulating cold water in the bath while stirring the reaction mass.

It will be noted in the above example that vinyl acetate is present in greater amount than all of the other ingredients combined, roughly 58% of the total mix. The emulgent is used in the proportion of 7% of the vinyl acetate.

This yields a sort of cream containing an excess of monomeric vinyl acetate. This excess however is harmless for the proposed applications.

Now this emulsion, thickened for example with dextrines or kindred substances, may be applied by a scraper on reverse side of velvets. By this method a sufficiently permanent sizing is produced. Such a sizing softens between 35 and 55° C.

The softening points of the emulsions may be raised by (a) increasing the time of polymerisation; (b) decreasing the amount of polymerisation catalyst; (c) decreasing the amount of plastifier.

In the above example the monomeric vinyl acetate is partly dissolved in the n-propanol which is, in turn, partly dissolved in the water. The plasticizer, benzyl alcohol, is soluble in both the water and the n-propanol. "Emulphur-O" assists in keeping the monomeric vinyl acetate in suspension and emulsifies the polymer as it is formed. The benzoyl peroxide is a polymerisation catalyst. The polymerisation product remains right in the emulsion and at no time separates out.

The ingredients above set out are only by way of example. In place of benzoyl peroxide any of a large number of polymerisation catalysts may be used, the usual ones being oxidizing agents including other organic peroxides or ozonides, metallic oxides capable of yielding oxygen etc.

Benzyl alcohol may be replaced by other water soluble plasticizers.

Normal propanol may be replaced by other low molecular weight alcohols as noted above.

The proportions existing among the ingredients may be varied within wide ranges to produce sizing compositions of different properties. The solvent content, water and n-propanol in the example, may be varied to change the viscosity of the product. The plasticizer may be varied to produce a size of more or less plasticity. The emulgent content may be varied to change the viscosity of the product.

Having now explained the invention and given an example thereof what is claimed is:

1. A process for the preparation of textile sizings comprising, mixing water, a low molecular weight water soluble alcohol, a water soluble plasticizer, an emulgent comprising the lauric ether of polyethylene oxide, and a polymerisation catalyst; adding to said mix monomeric vinyl acetate; said emulgent being present as from 5 to 20% of the vinyl acetate; and heating the resulting mix to polymerise the vinyl acetate.

2. A process for the preparation of a textile sizing which comprises the steps of mixing water, lauric ether of polyethylene oxide, benzoyl peroxide, benzyl alcohol, and n-propanol; thereafter adding monomeric vinyl acetate; and refluxing the resulting mixture for a time sufficient to polymerise a substantial part of the vinyl acetate.

3. The process of preparing a textile sizing which comprises the steps of mixing water 3000 g., lauric ether of polyethylene oxide 420 g., benzoyl peroxide 9 g., benzyl alcohol 120 g., n-propanol 720 g.; adding 6000 g. monomeric vinyl acetate;

and refluxing the resulting mixture for about 5 hours.

4. A textile sizing comprising polymerised vinyl acetate, water, a water soluble alcohol of low boiling point, a water soluble plasticizer having a free alcoholic function, and an emulgent comprising the lauric ether of polyethylene oxide.

5. The process of preparing an emulsion comprising mixing minor portions of water, a water soluble alcohol, and the lauric ether of polyethylene oxide; adding thereto a major portion of monomeric vinyl acetate; and polymerising the vinyl acetate to form an emulsion directly.

6. An emulsion comprising polymerised vinyl acetate, water, a low molecular weight water soluble alcohol, and lauric ether of polyethylene oxide in the proportion of from 5 to 20% of the vinyl acetate.

7. An emulsion comprising a major proportion of polymerised vinyl acetate, and minor proportions of water and a low molecular weight water soluble alcohol and lauric ether of polyethylene oxide.

8. An emulsion comprising water, a water soluble alcohol, a water soluble plasticizer, an emulgent comprising the lauric ether of polyethylene oxide, and polymerised vinyl acetate.

9. An emulsion of polymerised vinyl acetate in water and the lauric ether of polyethylene oxide in the proportion of from 5 to 20% of the vinyl acetate.

10. An emulsion comprising water a minor quantity, polymerised vinyl acetate a major quantity, and the lauric ether of polyethylene oxide.

HENRI GIBELLO.